2,984,584
Patented May 16, 1961

2,984,584

PROCESS OF MAKING CARBON IMPREGNATED GAS RESISTANT FABRICS AND RESULTANT ARTICLE

Sivert N. Glarum, Ardmore, Pa., and William J. Thackston, Jr., Haddon Heights, N.J., assignors to Rohm & Haas Company, Philadelphia, Pa., a corporation of Delaware No Drawing. Filed Jan. 31, 1945, Ser. No. 575,574

9 Claims. (Cl. 117—76)

This invention deals with fabrics which are resistant to war gases and to a method for the preparation of such fabrics. More particularly, this invention relates to gas-resistant fabrics impregnated with activated carbon which is bound thereto with an insoluble alginate and with a deposit of an acrylic resin.

For protection against war gases, it has been proposed to provide fabrics for garments which are impervious to gases. While garments from such fabrics may be used under certain special conditions, they are too uncomfortable for use over extended periods of time or for general use. There have accordingly been sought fabrics which are sufficiently permeable to air and water vapor to permit their use in wearable garments with some degree of comfort and at the same time to protect the wearer for a reasonable period of time from the dangerous effects of war gases.

Fabrics which have such a desirable combination of properties are provided by this invention. They are prepared by a process which comprises impregnating a fabric with a water-soluble alginate, a water-soluble copper or zinc salt, and finely-divided activated carbon, applying to the thus impregnated fabric an aqueous dispersion of an acrylic resin, and drying the treated fabric.

The fabric thus obtained remains permeable to air and water vapor and, at the same time, prevents the diffusion therethrough of vapors of war gases for a considerable length of time. Garments of this fabric permit normal activity without causing great discomfort. They retain their protective action after being worn and cleaned.

The carbon used may be any of the charcoals produced by destructive distillation of vegetable matter, with or without the conventional addition of chemicals, and characterized by rapid and effective adsorption. The activated carbon should be in a finely divided form when applied to fabric to ensure good penetration.

The carbon is incorporated in the solution of alginate. This solution may contain from about 5% to about 17% of finely divided carbon. There is no sharp lower limit, as the capacity for adsorption of gases merely falls off gradually as less carbon is used in impregnating. The concentration noted is merely one at which a useful degree of adsorption is attained. The upper limit is set primarily by the fact that at about such a concentration the impregnating bath becomes very thick. The usual cloths impregnated as described herein contain two to four milligrams of carbon per square centimeter.

Any water-soluble alginate may be used, including the ammonium and alkali metal salts thereof. The alginate is taken up in an aqueous solution in which the concentration may vary in general from about 2% to about 6%, depending in part upon the viscosity imparted by the particular alginate selected and the amount of activated carbon to be mixed therewith. Usually, concentrations of about 4% are to be preferred with the currently available types of soluble alginates.

The water-soluble alginates are rendered insoluble on the fabric by reaction with inorganic salts of metals giving insoluble alginates, such as copper or zinc. The copper and zinc salts are of particular interest because they yield water-soluble complexes with ammonia which may be mixed with the solution of alginate. As copper and zinc salts, there may be used any of the water-soluble salts, including sulfates, chlorides, acetates, or nitrates. The amount should in general correspond on an equivalent basis to the alginate. With the usual amounts of alginates, for example, from about 1.4% to 4.2% of hydrated zinc sulfate may be used or equivalent amounts of other copper or zinc salts. The upper limit is not sharp, as excess salt is washed out in a subsequent stage of the treatment.

In order to prepare a single impregnating bath containing carbon, soluble alginate, and a copper or zinc salt or a mixture of these two salts without suffering precipitation of an insoluble alginate in the bath, ammonia is added in an amount sufficient to prevent such precipitation. In general, there may be added to the bath from about 2% to about 6% of concentrated ammonia, the usual article of commerce being of about 28% strength. After this bath has been applied to a fabric, volatilization of the ammonia causes formation of an insoluble alginate on the fabric.

As a protective, resistant coating for the carbon, together with its binding of insoluble alginate, there is applied an acrylic resin. As a suitable resin, there may be used a polymer or mixture of polymers of methyl acrylate, ethyl acrylate, propyl acrylate, butyl acrylate, acrylonitrile, methyl methacrylate, ethyl methacrylate, butyl methacrylate, octyl methacrylate, or the like. Copolymers from two or more of the monomers are especially useful, as by proper choice of monomers various types of finishes may be readily obtained. For example, a minor proportion of an ethyl or butyl acrylate in a mixture with methyl acrylate or methacrylate gives a copolymer which provides a finish which is protective and yet which gives a good hand to the fabric at the same time.

The protective coating of acrylic resin is preferably applied to the carbon impregnated fabric from an aqueous dispersion. While solvent solutions may be used for the application of the resin, such solutions tend to inactivate the carbon, apparently by saturation of the carbon with solvent. If solvent coating should be used, it is necessary to launder the treated fabric in order to reach a reasonable degree of activity, entailing some loss in overall capacity of the fabric for war gases.

As suitable concentrations of resin solids in aqueous dispersions, concentrations of about 1% to about 20% may be used. Concentrations of the order of 5% to 10% are usually best, as they supply sufficient resin for good protection without imparting unnecessary stiffness or excessive body to the final fabric. Any concentration which imparts 1% to 10% resin solids on the weight of the fabric may be used.

In the accomplishment of this invention, a solution of water-soluble alginate is prepared. A solution of a copper or zinc salt is also prepared and, by the preferred method, made ammoniacal and then mixed with the alginate solution. Finely divided activated carbon is added thereto. This carbon dispersion is then applied to the fabric.

Application may be coating or immersion together with working, preferably under pressure, to drive the carbon and solution into all parts of the fabric. One of the best methods constitutes passing the fabric through the carbon-alginate suspension, followed by nipping with squeeze rolls. Repeated immersion and squeezing ensures the presence of carbon throughout the fabric and also accomplishes removal of excess material.

The carbon-alginate impregnated fabric is then dried. If a copper or zinc salt was not incorporated in the original carbon-alginate mixture, the dried fabric may then be treated with a solution of a soluble copper or zinc salt and thereafter dried again. This sort of procedure, however, involves extra procedural steps which may advantageously be avoided.

After the fabric has been dried with its carbon content bound with a water-insoluble copper or zinc alginate, it is treated with the acrylic resin and again dried.

At this point, the fabric may be scrubbed with water or with water and a detergent to remove loose carbon or excess carbon, which might otherwise cause crocking. If scrubbing is to be done, however, it has been found somewhat better in actual plant practice to scrub the fabric following the stage at which carbon has been applied and bound with an insoluble alginate and before the protective acrylic resin has been applied. The final fabric was then more uniform in color and appearance. If desired, the fabric may be scrubbed both after the carbon has been bound by drying with copper or zinc alginate and after the resin has been applied. The second wash has the advantage of producing an improved handle for the final fabric.

The methods described can be adapted to the finishing of almost any type or kind of fabric. Thus, the fabric may be made of cotton, wool, rayon, or other kind of fiber or of mixtures of these fibers. The construction may be woven or knitted. Typical fabrics which have been successfully rendered gas-resistant include flannels, ducks, twills, and herringbones. The fabric to be impregnated should be in a clean, open condition. Starch or gelatin sizing should be removed. Cotton should be boiled out and free of wax, but need not be bleached. The fabric may be dyed, if desired.

Typical procedures are given in the following examples.

*Example 1*

A gray cotton herringbone fabric was singed, desized with a diastatic enzyme, and given a caustic boil. It was then padded three times through a bath containing by weight about four parts of sodium alginate, three parts of copper sulfate, four parts of concentrated ammonia, and fifteen parts of carbon in sufficient water to make one hundred parts. The impregnated fabric was dried for ten minutes in a drier at 300° F.

A wash test with the fabric at this point showed that the dried fabric had a "Penetration Time" against mustard gas, as determined by the "British Free Diffusion" method, of over 420 minutes. Washing in water at 130° F. reduced this time to 286 minutes, while one mild soap wash reduced this time to 155 minutes.

The impregnated fabric was then padded through an aqueous bath containing a suspension of a copolymer of ethyl acrylate and methyl acrylate at 5% resin solids. The resin-topped fabric was dried in an oven at about 220° F. and then washed and again dried.

A sample of this fabric was given a hot water wash. The penetration time of the washed sample was over 400 minutes. Another sample washed with mild soap and rinsed still showed penetration times over 300 minutes.

*Example 2*

The procedure of carbon-impregnating fabric was followed as in Example 1 until the carbon had been bound with copper alginate. Then, it was padded through an ethyl acetate solution containing 5% of acrylic resins. The fabric was dried. It then had a penetration time of only 89 minutes. When, however, it was tumbled in hot water for thirty minutes and then dried, it had a penetration time of over 400 minutes.

*Example 3*

A cotton twill was desized with enzymes, kier-boiled, and dyed to a yellowish olive shade. It was then padded twice through a bath containing 4% of ammonium alginate (low viscosity type), 2.8% of hydrated zinc sulfate, 4% of concentrated ammonia water, 15% of a finely divided activated carbon, and 74.2% of water. After each immersion, the fabric was squeezed between a brass and a maple wood roll. After the second nip, the fabric was dried at its original width in a hot-tenter frame. The dried fabric was then run through a scrubber in which loose carbon was removed by a rotating brush and a water spray. The fabric was dried again. It was then padded through an aqueous bath containing about 5% of acrylic resin solids in finely dispersed form, prepared by diluting a commercial concentrated acrylic resin suspension, such as used for the finishing of textiles. Again the fabric was dried on a frame. It was then shrunk to stable dimensions in the conventional manner.

This fabric was found to be satisfactorily resistant to mustard gas, to withstand a reasonable number of washings, and to have sufficient permeability to air to provide comfort to wearers of garments made therefrom.

Fabrics prepared by impregnation with carbon bound by a copper or zinc alginate and finished with a dispersion of an acrylic resin are useful in the manufacture of garments which will protect the wearer from poison gases, such as mustard, Lewisite, nitrogen mustard, etc. The new fabrics retain their activity indefinitely and may be laundered without serious loss of protective action.

We claim:

1. A process for preparing gas-resistant fabrics which comprises impregnating fabrics with finely divided activated carbon, a water-soluble alginate, and a water-soluble salt of a metal selected from the group consisting of copper and zinc insolubilizing said alginate with said salt, and applying to the thus impregnated fabric a dispersion of an acrylic resin.

2. A process for preparing gas-resistant fabrics which comprises treating a fabric with an aqueous bath containing a water-soluble alginate, ammonia, a water-soluble salt of a metal selected from the group consisting of copper and zinc, and finely divided activated carbon, drying the thus treated fabric, and applying thereto an aqueous suspension of an acrylic resin.

3. A process for preparing gas-resistant fabrics which comprises treating a fabric with an aqueous bath containing a water-soluble alginate, ammonia, a water-soluble copper salt, and finely divided activated carbon, drying the thus treated fabric, and applying thereto an aqueous suspension of an acrylic resin.

4. A process for preparing gas-resistant fabrics which comprises treating a fabric with an aqueous bath containing a water-soluble alginate, ammonia, a water-soluble zinc salt, and finely divided activated carbon, drying the thus treated fabric, and applying thereto an aqueous suspension of an acrylic resin.

5. A process for preparing gas-resistant fabrics which comprises impregnating a fabric with an aqueous bath containing 2% to 6% of a water-soluble alginate, an approximately equivalent amount of a water-soluble salt of a metal selected from the group consisting of copper and zinc, sufficient ammonia to cause precipitation of said salt with alginate, and 5% to 17% of finely divided activated carbon, drying the impregnated fabric, applying thereto an aqueous suspension containing about 1% to about 20% of an acrylic resin, and removing unbound carbon from the fabric.

6. A gas-resistant fabric carrying finely divided activated carbon bound with a water-insoluble salt of alginic acid and a metal selected from the group consisting of copper and zinc and carrying a water-insoluble acrylic resin.

7. A gas-resistant fabric carrying finely divided activated carbon bound with copper alginate and carrying a deposit of a water-insoluble acrylic resin.

8. A gas-resistant fabric carrying finely divided activated carbon bound with zinc alginate and carrying a deposit of a water-insoluble acrylic resin.

9. A gas-resistant fabric impregnated with finely divided activated carbon and a water-insoluble salt of alginic acid and a metal selected from the group consisting of copper and zinc and finished with a deposit of an acrylic resin in an amount of about 1% to 10% of the weight of the fabric.

References Cited in the file of this patent
UNITED STATES PATENTS

| | | |
|---|---|---|
| 1,456,494 | Rowland | May 22, 1923 |
| 2,290,633 | Cate | July 21, 1942 |

OTHER REFERENCES

Technical Abs. vol. III, Nos. 11 and 12, November and December 1944, page 737.